United States Patent Office 2,696,649
Patented Dec. 14, 1954

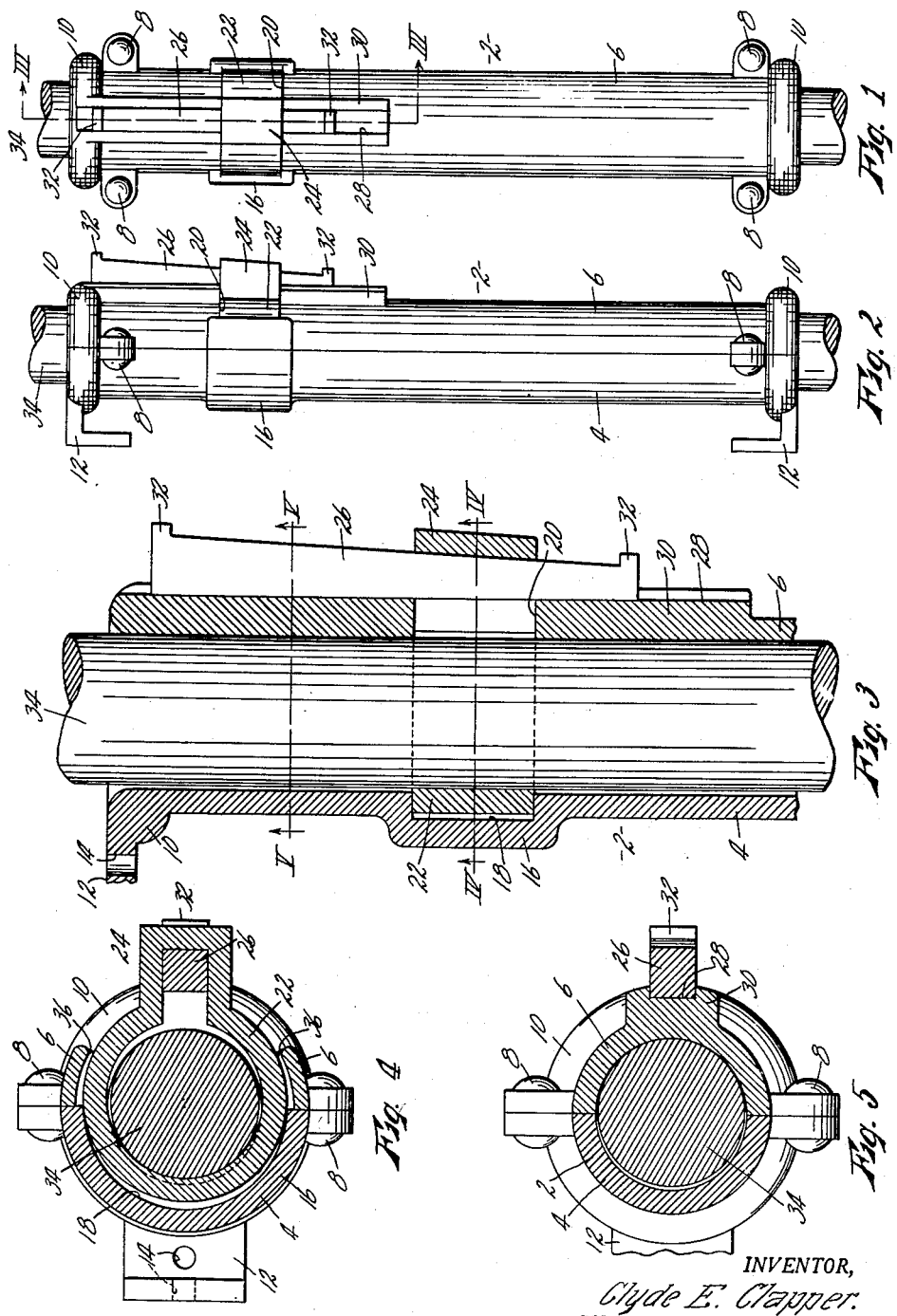

2,696,649

SHAFT GRIPPING CLAMP

Clyde E. Clapper, Kansas City, Mo.

Application April 11, 1949, Serial No. 86,777

2 Claims. (Cl. 24—243)

This invention relates to new and useful improvements in shaft gripping clamps, and has particular reference to a shaft gripping clamp of the wedging type.

The principal object of the present invention is the provision of a shaft gripping clamp having a tubular body member adapted to be slipped over a shaft, rod, pipe, or the like, and having a clamp ring disposed within said body member about said shaft, and means for moving said ring transversely of said body member, whereby said shaft is gripped between said ring and said body member.

Another object is the provision, in a shaft gripping clamp of the class described, of a wedging member operable from outside of said body member and adapted to move said clamping ring.

Other objects are simplicity and economy of construction, ease and efficiency of operation, inclusion of all the parts inseparably in a unit, and adaptability to fit shafts of different sizes.

With these objects in view, as well as other objects which will appear in the course of the specification, reference will be had to the drawing, wherein:

Figure 1 is a front elevation of a shaft gripping clamp embodying the present invention, shown in operative relation to a shaft, which is shown fragmentarily.

Fig. 2 is a left side view of the parts shown in Fig. 1.

Fig. 3 is an enlarged fragmentary section taken on line III—III of Fig. 1, with parts left in elevation.

Fig. 4 is a section taken on line IV—IV of Fig. 3.

Fig. 5 is a fragmentary section taken on line V—V of Fig. 3.

Like reference characters apply to similar parts throughout the several views, and the numeral 2 applies to a tubular body member comprising longitudinal semi-cylindrical sections 4 and 6 rigidly joined by any suitable means such as rivets 8. Said body sections are formed to present outwardly extending circumferential reinforcing ribs 10 at each end thereof. Body member 4 is formed to present integral, outwardly extending angled brackets 12 having holes 14 formed therein, whereby the clamp may be attached to a wall or other structural member, or by means of which objects may be attached to the clamp. The number, arrangement, and configuration of the brackets are, of course, matters of choice, and will vary according to the particular use to which the clamp is put.

Intermediate its ends, body member 2 is provided with a circumferential enlargement 16. A circumferential groove 18 is formed in the internal wall of the body member in alignment with enlargement 16. Said groove extends around body section 4, traverses the transverse edge portions of body section 6, and communicates at its ends with a substantially rectangular window 20 formed through body section 6, said window being of the same width as said groove.

A clamp ring 22 is disposed loosely within groove 18, and said ring is provided with an outwardly offset portion forming a loop 24 which extends outwardly through window 20. A wedge 26 disposed longitudinally relative to body member 2, extends through the outwardly extended portion of loop 24. Said wedge is carried slidably in a groove 28 formed longitudinally in a rib 30 formed on the outer surface of body section 6. At each end, wedge 26 is provided with an outwardly extending ear 32 which prevents the wedge from coming out of loop 24 accidentally. Said ears also provide hammer lugs by means of which the wedge may be driven longitudinally.

In operation, wedge 26 is driven upwardly till the thinner end portion thereof is disposed within loop 24 of clamp ring 22, the clamp ring is pushed inwardly, and a shaft 34 is inserted through body member 2. The internal diameter of said clamp ring is slightly greater than the internal diameter of the body member, in order to provide easy insertion of the shaft. Wedge 26 is then driven downwardly so that a thicker portion thereof is disposed within loop 24 of the clamp ring. The clamp ring is thereby offset in the body member toward the wedge, and shaft 34 is clamped tightly between said ring and body section 6. It will be noted that the portions of clamp ring groove 18 within body section 6 are of greater depth than in body section 4, thus providing clearance 36 between said clamp ring and body section 6 which permits said clamp ring to be drawn outwardly by the wedge. At the same time body section 6 extends sufficiently far about the clamp ring to prevent withdrawal of the ring through window 20. The distance which the clamp ring may be moved by wedge 26 is limited by the amount of the clearance 36. This clearance may be sufficiently great to permit the clamp to grip shafts of a considerable range of sizes.

In assembly of the parts, clamp ring 22 is inserted in the body member 2 before the sections thereof are joined by rivets 8. The clamp ring is sufficiently resilient that it may be compressed and extended far enough through window 20 to permit ear 32 on the thinner end of wedge 26 to be passed through loop 24 of said ring. When the ring is then pushed inwardly into the body member, it will expand resiliently, and both the ring and the wedge secured against accidental separation from the body member.

While I have shown a specific embodiment of my invention, it is apparent that many minor variations of construction and operation could be made without departing from the spirit of the invention.

What I claim is:

1. A shaft gripping clamp comprising a tubular body member adapted to receive a shaft therethrough, said body member having a window formed in the wall thereof and an internal circumferential groove registering with said window, a clamp ring disposed in said groove and being adapted to be moved transversely relative to said body member, said ring having an outwardly offset portion extending through said window, and a wedge carried slidably in a groove formed longitudinally in the outer surface of said body member and extending through the offset portion of said clamp ring.

2. A shaft gripping clamp comprising a tubular body member adapted to receive a shaft therethrough, said body member having a window formed in the wall thereof, an internal circumferential groove registering with said window, and a longitudinal external groove intersecting said window, a clamp ring disposed in said internal groove, said clamp ring having an offset portion forming a loop extending outwardly through said window, said clamp ring groove being deeper adjacent said window whereby to permit movement of said clamp ring toward said window transversely to said body member, and said window extending less than half the circumference of said body member whereby said clamp ring is retained in said body member, and a wedge carried slidably in said external groove and extending through the loop of said clamp ring, said wedge having outwardly projecting ears at its ends to prevent withdrawal thereof from said loop.

References Cited in the file of this patent

UNITED STATES PATENTS

| Number | Name | Date |
|---|---|---|
| 703,925 | Horsley | July 1, 1902 |
| 830,691 | Waterman | Sept. 11, 1906 |
| 918,407 | Wiest | Apr. 13, 1909 |
| 1,134,565 | Vibber | Apr. 6, 1915 |

(Other references on following page)

UNITED STATES PATENTS

| Number | Name | Date |
|---|---|---|
| 1,250,003 | Phenicie | Dec. 11, 1917 |
| 1,381,217 | Neely | June 14, 1921 |
| 1,400,701 | Vreeland | Dec. 20, 1921 |
| 1,693,240 | Lampert | Nov. 27, 1928 |
| 2,095,714 | Pinaud et al. | Oct. 12, 1937 |
| 2,327,990 | Benson | Aug. 31, 1943 |
| 2,390,267 | Pearce | Dec. 4, 1945 |
| 2,554,430 | Vines | May 22, 1951 |

FOREIGN PATENTS

| Number | Country | Date |
|---|---|---|
| 79,080 | Germany | June 2, 1893 |
| 486,258 | Germany | Jan. 11, 1929 |